United States Patent
Deng et al.

(10) Patent No.: US 9,796,575 B2
(45) Date of Patent: Oct. 24, 2017

(54) BEVERAGE PREPARATION MACHINE CAPABLE OF DETERMINING A BEVERAGE VOLUME OF RECEPTACLES AND CORRESPONDING METHOD

(71) Applicant: Nestec S.A., Vevey (CH)

(72) Inventors: Ting Deng, Shanghai (CN); Ruguo Hu, Shanghai (CN)

(73) Assignee: Nestec S.A., Vevey (CH)

( * ) Notice: Subject to any disclaimer, the term of this patent is extended or adjusted under 35 U.S.C. 154(b) by 112 days.

(21) Appl. No.: 14/784,404

(22) PCT Filed: Apr. 17, 2013

(86) PCT No.: PCT/CN2013/074309
§ 371 (c)(1),
(2) Date: Oct. 14, 2015

(87) PCT Pub. No.: WO2014/169447
PCT Pub. Date: Oct. 23, 2014

(65) Prior Publication Data
US 2017/0135519 A1    May 18, 2017

(51) Int. Cl.
*B67D 1/12* (2006.01)
*A47J 31/44* (2006.01)

(52) U.S. Cl.
CPC ........ *B67D 1/1236* (2013.01); *A47J 31/4457* (2013.01); *A47J 31/4482* (2013.01)

(58) Field of Classification Search
CPC .... G01F 17/00; F25D 2700/06; F25D 23/126; B67D 1/1236
USPC ............................ 141/192, 198, 95, 360, 351
See application file for complete search history.

(56) References Cited

U.S. PATENT DOCUMENTS

| | | | | |
|---|---|---|---|---|
| 5,566,732 A | * | 10/1996 | Nelson | G07F 13/025 141/351 |
| 8,109,301 B1 | * | 2/2012 | Denise | F25C 5/005 141/198 |
| 8,746,296 B2 | * | 6/2014 | Tobbe | B67D 1/1236 141/198 |
| 2008/0264092 A1 | | 10/2008 | Chase et al. | |

(Continued)

FOREIGN PATENT DOCUMENTS

| | | |
|---|---|---|
| CN | 101730494 | 6/2010 |
| JP | 200395393 | 4/2003 |
| WO | 2008138710 A1 | 11/2008 |

OTHER PUBLICATIONS

CN201380075665.2; Ting Deng, Office Action with an English translation, dated Dec. 2, 2016.

(Continued)

*Primary Examiner* — Timothy L Maust
*Assistant Examiner* — Timothy P Kelly
(74) *Attorney, Agent, or Firm* — Dunlap Codding, P.C.

(57) ABSTRACT

A beverage preparation machine includes first and second cameras for capturing first and second images of a receptacle. The beverage preparation machine further includes a control unit configured to determine a receptacle volume based on the first and second images and to determine a beverage volume to be dispensed based on the receptacle volume and the selected filling level or percentage. Regardless of the shape, volume, and/or material of the receptacle, the filling level or percentage for dispensing the beverage can be freely selected via a user interface.

17 Claims, 8 Drawing Sheets

(56) References Cited

U.S. PATENT DOCUMENTS

| | | |
|---|---|---|
| 2009/0183796 A1 | 7/2009 | Chase et al. |
| 2009/0314801 A1 | 12/2009 | Ashrafzadeh et al. |
| 2010/0155415 A1 | 6/2010 | Ashrafzadeh et al. |
| 2012/0138629 A1 | 6/2012 | Ashrafzadeh et al. |

OTHER PUBLICATIONS

International Search Report, dated Jan. 9, 2014, in PCT/CN2013/074309, filed Apr. 17, 2013.
Written Opinion of the International Searching Authority, dated Jan. 9, 2014, in PCT/CN2013/074309, filed Apr. 17, 2013.

* cited by examiner

BEVERAGE PREPARATION MACHINE CAPABLE OF DETERMINING A BEVERAGE VOLUME OF RECEPTACLES AND CORRESPONDING METHOD

CROSS REFERENCE TO RELATED APPLICATIONS/INCORPORATION BY REFERENCE STATEMENT

This application is a US national stage application filed under 35 USC §371 of International Application No. PCT/CN2013/074309, filed Apr. 17, 2013. The entire contents of the above-referenced application are hereby expressly incorporated herein by reference.

BACKGROUND

The presently disclosed and/or claimed inventive concept(s) is directed to a beverage preparation machine capable of determining a beverage volume of receptacles and a corresponding beverage preparation method. In particular, the beverage preparation machine and method allow accurate beverage volumes dispensed in receptacles as a response to a user selecting desired filling volumes, percentage or levels for receptacles having variant shapes, volumes, and/or materials.

From the state of the art, beverage preparation machines are known that use capsules containing beverage ingredients to be extracted or to be dissolved. Other beverage preparation machines use beverage ingredients, which are stored and dosed automatically in the machine, and are dissolved in a liquid, usually water. For both kinds of beverage preparation machines, the filling of the produced beverage into a receptacle, such as a cup or glass, is usually controlled in several different ways.

For example, the filling of a receptacle can be controlled by a controller based on several preset fill programs. According to one of the preset fill programs, a pump is activated and deactivated via a relay. As a drawback, a beverage preparation machine using this way of filling needs to be provided with a series of operating buttons, wherein each one of the buttons relates to a different beverage volume that is to be delivered into the receptacle.

Alternatively, the filling of a receptacle can be controlled by barcode recognition, wherein a barcode is typically provided on a packaged portion of a beverage ingredient packaging. When the barcode is read by the beverage preparation machine, a filling instruction—e.g. information regarding an ingredient type, a water volume or even a heating/cooling temperature—is transmitted to the beverage preparation machine. The beverage preparation machine then operates a pump according to one of several recorded programs based on the transmitted filling instruction.

As a drawback, neither one of the above described ways of filling a receptacle allows a user to freely select the desired filling volume in a simple manner and regardless of the type of receptacle.

Furthermore, the filling of a receptacle can be controlled manually, i.e. via manual activation and deactivation of a pump of the beverage preparation machine. The pump can, for example, be controlled via a button, a lever or some other kind of operating means. As a drawback, the user must remain attentive during the whole beverage preparation process, in particular during the filling of the beverage into the receptacle, in order to avoid spill over of the beverage. A further drawback is that the control of the desired beverage volume that is dispensed beverage is not very accurate.

It is moreover a problem that the receptacles of different users of a beverage preparation machine will typically vary in material, shape and/or volume. Thus, there is the need for a beverage preparation machine and a corresponding method, which are able to automatically fill any kind of receptacles with a desired beverage volume, i.e. to a desired filling level such as 50% full-filled or 70% full-filled or the like.

U.S. Pat. No. 4,458,735 discloses a device for automatically controlling the delivery of a beverage, such as a milkshake, into a receptacle made of translucent paper or foam. The receptacle is positioned under a source of radiation, which directs a light ray against the rim of the receptacle. The light ray passes through the receptacle, and is detected by a radiation detector, which is situated on the opposite side of the receptacle. The signal received by the detector is compared with a signal value level, and when the attenuated signal drops below the signal value level, the delivery of the beverage is halted. As a drawback, the device does not provide sufficient detection accuracy, in particular not for coffee receptacles, on account of the way in which the incident signal is detected and then compared. A further drawback is that the device is unsuitable to be used with translucent receptacles. Finally, another drawback is that the device does not allow choosing various fill volumes, i.e. filling levels of the receptacle.

WO 97/25634 discloses a method and a device for detecting the position of an object such as a container in a target window using the concept of triangulation of radiant energy. The device uses a first pair and a second pair of emitters and receivers, and uses a triangulation calculation to detect the presence of the container.

WO 99/50172 discloses a method for detecting and controlling the filling of a cup with a dispensing apparatus by using several light transmitters and receivers of light rays, which are reflected by the cup and by the liquid inside the cup, respectively.

PCT/EP08/054858 discloses a beverage preparation device having a touch screen showing a virtual representation of a cup, on which the user can move up and down a desired filling level, before the beverage dispensing process is initiated to fill the cup to the desired filling level.

WO 2006/063645 discloses a beverage preparation machine with an interface for selecting the filling level of a cup to be filled. In one embodiment, a marking means for indicating the desired filling level on a side of the cup is provided in the form of a user-operable laser beam emitter that forms displaceable visible spot on the inner side of the cup. The user-operable emitter cooperates with a receiver for detecting the presence of the beverage supplied to the cup, when the beverage reaches the desired filling level, in order to interrupt the supply of the beverage.

WO 2009/135821 discloses a beverage preparation device with a user interface allowing a user to select a desired filling level of cup. The interface comprises a means for detecting a position of a human finger and/or a hand-held freely movable pointing instrument adjacent to and pointing towards a side of the cup. The filling means are arranged to derive from the detected position of the finger and/or pointing instrument the user-selected level of fill and to fill the cup up to this level.

The presently disclosed and/or claimed inventive concept(s) is directed to improving the state of the art, specifically in view of the above-described drawbacks. In particular, the presently disclosed and/or claimed inventive concept(s) provides a beverage preparation machine (and a corresponding beverage preparation method) that can recognize receptacles of variant shapes, volumes, sizes and/or materials, and is able to allow a user to freely select a desired filling level or percentage regardless of the used receptacle in an easy and convenient manner. A further particular non-limiting embodiment of the presently disclosed and/or claimed inventive concept(s) is to enable a more accurate filling of a beverage into a receptacle with a desired filling level or percentage.

BRIEF DESCRIPTION OF THE DRAWINGS

In the following the presently disclosed and/or claimed inventive concept(s) will be described in more detail with reference to the attached drawings.

DETAILED DESCRIPTION

Figure 1:
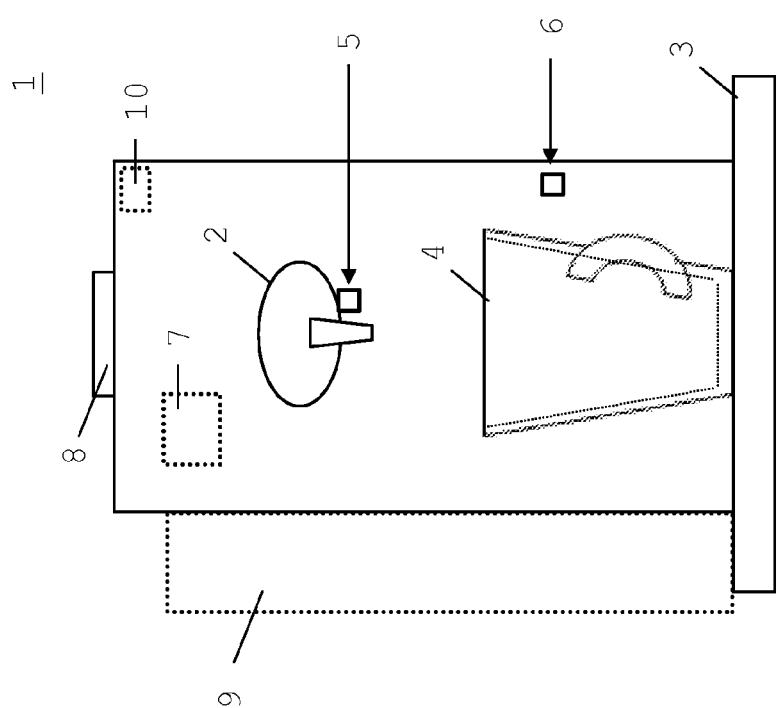
FIG. 1 shows a beverage preparation machine according to the presently disclosed and/or claimed inventive concept(s).

The above-mentioned objects are solved by the independent claims of the presently disclosed and/or claimed inventive concept(s). The dependent claims develop further advantages of the presently disclosed and/or claimed inventive concept(s).

In particular, the presently disclosed and/or claimed inventive concept(s) is directed to a beverage preparation machine comprising a beverage outlet for dispensing a beverage into a receptacle, a first camera for capturing a first image of the receptacle, a second camera for capturing a second image of the receptacle, a user interface for selecting a filling level or percentage of the receptacle, and a control unit configured to determine a receptacle volume based on the first image and the second image, and to determine a beverage volume to be dispensed based on the receptacle volume and the selected filling level or percentage.

Based on the first image and the second image it is possible for the control unit to precisely calculate the volume of any receptacles suitable for serving beverages (such as coffee, tea and the likes) including receptacles having different dimensions and/or shapes. Therefore, the filling of the beverage into the receptacle to precisely the selected filling level or percentage can be carried out regardless of the kind of receptacle that is used. The beverage preparation machine can also be equipped with three or even with more cameras, in order to achieve an even higher accuracy of the receptacle volume calculation. Furthermore, the user does not need to take into account or worry about the particular shape, dimensions (e.g., thickness), volume or constituting material of the used receptacle when selecting the filling level or percentage. Further, the machine does not require different buttons, nor does the user need to carry out different operations on the user interface of the machine for different receptacles. Therefore, the desired filling level or percentage can be selected in a simple and more convenient manner.

In certain, non-limiting embodiments, the first camera is positioned for capturing a top-view image of the receptacle as the first image, and the second camera is positioned for capturing a side-view image of the receptacle as the second image. The cameras are positioned for capturing these images when the receptacle is normally placed on the support below the beverage outlet, i.e., in a beverage dispensing position.

All parameters, which are necessary to carry out a calculation of the volume of the receptacle, can be derived from the top-view image and the side-view image. Thereby, the shape, size, volume, material, and/or wall thickness of the receptacle becomes irrelevant.

In certain, non-limiting embodiments, the first camera is positioned close to the beverage outlet, and the second camera is positioned between the beverage outlet and a support for receiving the receptacle.

In certain, non-limiting embodiments, the first camera is positioned in line with the central axis the receptacle, i.e. directly above the receptacle, when the receptacle is placed in the beverage dispensing position on the support. The second camera is, in certain non-limiting embodiments, positioned adjacent to the receptacle, i.e. deviating from the central axis of the receptacle. The cameras can be both provided with wide-angle lenses to ensure the capture of the full image of receptacles comprised within a wide range of sizes.

In certain, non-limiting embodiments, the first camera is provided with anti-condensation means. The second camera may also be provided with anti-condensation means.

Since the first camera is positioned, in certain non-limiting embodiments, near the beverage outlet of the beverage preparation machine, there is the danger that hot steam condensates on the camera lens, which may hamper a precise receptacle volume calculation. Therefore, the anti-condensation means help to improve the accuracy of the calculation of the receptacle volume, and thus of the filling of the beverage into the receptacle. The anti-condensation means can be provided as one or more anti-condensation layers on the lens of the first camera. The means can, for example, be provided as a layer consisting of chemicals that prevent the condensation of water on the lens surface. Also the second camera can be provided with such anti-condensation means. Further, the camera lenses are, in certain non-limiting embodiments, both provided with a dirt repelling and/or oil repelling layer, or with a self-cleaning layer.

According to an aspect of the presently disclosed and/or claimed inventive concept(s), the control unit is configured to calculate:

from the first image: the area of the rim, the inner diameter, outer diameter of the rim of the receptacle, the area of the inner bottom, the inner diameter of the bottom of the receptacle, and a wall thickness of the receptacle and the inner height of the receptacle, from the second image: the outer height of the receptacle, the width of the outer bottom of the receptacle, the outer shape of the receptacle, optionally, the largest width and a width increase, if any, of the receptacle at a distance of the top and bottom of the receptacle.

Furthermore, in order to obtain an accurate inner height value of the receptacle, a possible calculation, by image forming principle, consists in determining the distance between the camera from the inner bottom of the receptacle and the distance between the camera from the rim. In another principle, the inner height is simply determined as a predetermined variation of the outer height. The predetermined variation can be extracted from a data base. For example, the data base can comprise distribution curves corresponding to a plurality of containers.

By means of the above-described parameters, the volume of the receptacle, i.e. the empty volume inside of the receptacle that can be filled with the beverage, can be precisely calculated. The wall thickness of the receptacle can thereby be taken into account. The receptacle volume can be calculated precisely for all kinds of receptacles having either straight (i.e. more or less vertical) side walls or slanted side walls. In fact, a precise three-dimensional representation of the receptacle can be simulated by the control unit, and an according simulated image can be generated.

In certain, non-limiting embodiments, the control unit is configured to calculate from the first and second image an uneven wall thickness of the receptacle.

The outer surface of the receptacle side wall and the inner surface of the receptacle side wall can have different slopes, i.e. the wall thickness can vary along the height of the receptacle. By taking such an uneven wall thicknesses into account when calculating the receptacle volume, a more precise filling of the beverage into the receptacle to the desired filling level or percentage can be carried out.

In certain, non-limiting embodiments, the control unit is configured to display based on the second image an image of the receptacle on the user interface.

Thus, the user is able to intuitively set the filling level or percentage of the receptacle. The user can be provided with a virtual filling line shown in respect to the displayed receptacle. In certain non-limiting embodiments, the virtual filling line can be manipulated by a user to set the filling level or percentage. The displayed image of the receptacle can e.g. be the second image, i.e. a side-view of the receptacle, which is overlaid with a virtual filling line. In certain, non-limiting embodiments, however, the control unit is adapted to generate an image, i.e. a simulated image, of the receptacle based on the above-described parameters.

In certain, non-limiting embodiments, the user interface comprises a touch-screen or touch-pad.

The user can then set the filling level or percentage very conveniently, namely by moving e.g. a finger or pen over the touch-screen or touch pad. The user can e.g. drag a virtual filling level, which is overlaid with the displayed image of the receptacle, up or down as desired to change the filling level. The user interface can further provide the user with information regarding e.g. the volume of the receptacle, the maximum possible beverage volume, a current beverage volume to be dispensed based on the selected filling level, a filling level value of the receptacle in percentage, or similar information.

In a possible aspect, the control unit is configured to determine a water volume in a water tank of the machine, such as (but not limited to) via a pressure sensor, and to issue a feedback signal when the water volume is less than the beverage volume to be dispensed. The feedback signal may be a warning signal and/or a signal disabling the water pump of the machine, for instance.

With a pressure sensor the beverage preparation machine can easily and precisely monitor the water level in the water tank. The warning signal can e.g. be displayed on the user interface. However, other means for providing the warning signal, e.g. as acoustical, optical or other signal, can be provided as well.

In certain, non-limiting embodiments, the control unit is configured to issue a second warning signal when the water volume is less than the determined receptacle volume.

The user can thus perceive that the water level in the tank is not sufficient to fill the whole volume of the receptacle with the beverage. The user can accordingly re-set the filling level or percentage or can refill the water tank. The user interface can suggest to the user a filling level, e.g. the highest possible filling level for the current amount of water in the tank.

In certain, non-limiting embodiments, the beverage preparation machine comprises a memory unit for storing a database including pre-stored images of receptacles, wherein the control unit is configured to determine, whether the receptacle is included in the database by matching the first image and/or the second image with the stored images of receptacles, and to read a correspondingly stored receptacle volume, if the image of the receptacle and/or its corresponding (e.g., calculated) volume is stored in the database.

By way of the above-described matching process, the currently used receptacle can be determined very quickly, and the receptacle volume can be obtained without any further calculation. Further, the receptacle can be displayed on the user interface without any simulation or generation of a new image. Thus, the beverage preparation machine is able to operate faster and more efficiently.

In certain, non-limiting embodiments, the control unit is configured to update the database by storing a new image and/or volume of the receptacle based on the first image and/or the second image.

Thereby, the beverage preparation machine is able to acquire the image(s) of any new receptacle and thereby learn by itself so that its operation gets faster and more efficient over time.

In a possible mode, the control unit is configured to record a beverage consumption for each of the receptacles in the database, and to display on the user interface information regarding the beverage consumption of the currently used receptacle.

The information concerning the beverage consumption can for example relates to the amounts of ingredients in the beverage, e.g. amounts of sugar, calories, fat/oil, caffeine or the like. The information can also be presented as a suggestion or a recommendation to the user, e.g. a health recommendation, if the recorded beverage consumption corresponding to the currently used receptacle shows that the consumed amount of one or more of the mentioned ingredients exceeds a daily, weekly or monthly threshold value. If duplicate receptacles are used, the user information can prompt the user to make further input, in order to resolve the uncertainty.

In a possible aspect, the first camera and the second camera are configured to capture images at predetermined time intervals, and the control unit is configured to activate the beverage preparation machine from a stand-by mode, when the first and second image of the receptacle, respectively, are captured at a predetermined number of consecutive time intervals.

Thus, the stand-by mode can be activated more frequently for reducing power consumption of the machine, without the user being overly annoyed by the stand-by mode, since the beverage preparation machine will be activated automatically when the receptacle is positioned in the field of view of one or both of the cameras for a time exceeding a predetermined threshold value.

The presently disclosed and/or claimed inventive concept(s) is further directed to a beverage preparation method comprising the steps of capturing a first image of a receptacle, such as (but not limited to) its top-view images, capturing a second image of the receptacle, such as (but not limited to) its side-view images, determining a receptacle volume based on the first image and the second image, determining a beverage volume to be dispensed based on the receptacle volume and the selected filling level, and dispensing the beverage volume into the receptacle.

It should be noted that the selection of the filling volume can be made by a selection of a virtual filling level or a relative value of volume such as a percentage (e.g., a percentage of a beverage volume relative to the "filled" volume of the receptacle) or an absolute value of volume.

The method of the presently disclosed and/or claimed inventive concept(s) provides the same advantages that have been described above with respect to the beverage preparation machine.

For the following detailed description of the presently disclosed and/or claimed inventive concept(s), a coffee machine can be taken as an example of a beverage preparation machine. However, the beverage preparation machine of the presently disclosed and/or claimed inventive concept(s) can also be configured to provide other liquid or semi-liquid beverages or foods, like tea, milk-based beverages, e.g. milkshakes or frappes, chocolate or cocoa based beverages, nutritional beverages, e.g. baby-food, soups or bouillons.

FIG. 1 shows schematically a beverage preparation machine 1 according to the presently disclosed and/or claimed inventive concept(s). In general, the beverage preparation machine 1 is, in certain non-limiting embodiments, equipped with a water tank 9, a water pump (not shown) for transferring water from the water tank 9 to a brewing chamber (not shown). In certain, non-limiting embodiments, the brewing chamber contains the beverage ingredients or is designed as a capsule holding chamber for holding a capsule containing beverage ingredients (not shown). The machine 1 can be further provided with a heating device (not shown) for heating the water for brewing, and a beverage outlet 2 for dispensing the brewed beverage. The machine 1 can further comprise a support 3 for the receptacle such as a drip tray designed for receiving a receptacle 4 so that the receptacle 4 can be aligned with the beverage outlet 2. Such a support 3 for the receptacle also serves as drain for any spilled beverage or other liquid.

The machine 1 is further provided at least with a first camera 5 and with a second camera 6. In certain, non-limiting embodiments, the camera is rapid photographic cameras using visible light, infra-red or both. In certain, non-limiting embodiments, the at least two cameras 5, 6 are both auto-focus adjustable cameras, and are suited for taking optical images of a receptacle 4 that is positioned for receiving the dispensed beverage. For better results the receptacle 4 is placed directly beneath the beverage outlet 2. Then also the beverage can be dispensed into the receptacle 4 without spilling.

In certain, non-limiting embodiments, the first camera 5 is positioned close, e.g., adjacent, to the beverage outlet 2, such as (but not limited to) attached to or even integrated with the beverage outlet 2, in order to take at least one top view image or several images of the receptacle 4. Considering that hot steam may come out from the beverage outlet 2, the first camera 5 is, in certain non-limiting embodiments, provided with an anti-condensation means. For example, the lens of the first camera 5 can be provided with a layer or a sheet of an anti-condensation material, like a water repelling material or a chemical suited to prevent condensation of water on the lens surface. Also multiple layers or sheets can be provided. The lens of the first camera 5 can also be provided with a thin foil made of an anti-condensation material. Another possibility is to provide a translucent but steam-impermeable cover that protects the lens of the first camera 5. In certain, non-limiting embodiments, the beverage outlet 2 and the first camera 5 are positioned axially above the support 3 for the receptacle.

In certain, non-limiting embodiments, the position of the second camera 6 is below and axially offset relative to the position of the first camera. In certain, non-limiting embodiments, the second camera 6 is located between the support for the receptacle 3 and the outlet, in order to acquire side-view images of the receptacle 4 when the receptacle is placed on the support 3, in axial alignment with the outlet, in beverage dispensing position. The height on the machine 1, at which the second camera 6 is positioned, depends on the distance between the beverage outlet 2 and the support for the receptacle 3. In certain, non-limiting embodiments, the second camera 6 is positioned such that it is adjacent to a receptacle 4 of typical height, such as (but not limited to) at half the height of the typical receptacle 4. In certain, non-limiting embodiments, the second camera 6 is positioned at a height comprised between 25 and 80 mm above the level of the receptacle support 3.

The beverage preparation machine 1 is further equipped with a control unit 7 for controlling the dispensing process of the beverage from the beverage outlet 2. That means the control unit 7 is at least adapted to operate the pump and the heating of the machine 1. The control unit 7 controls the amount of water and the temperature for brewing a beverage. In particular the control unit 9 is also suited to process the captured images of the at least two cameras 5, 6, and to calculate a receptacle volume based on the first and second image. The control unit 7 can, for example, be a microprocessor or an integrated circuit or other chip. The control unit 7 can include (or be provided with) a memory unit 10, and is, in certain non-limiting embodiments, configured to store data in the memory unit 10 and to read data from the memory unit 10.

The beverage preparation machine is further equipped with a user interface 8, which allows a user to set parameters of the machine 1, e.g. parameters concerning the beverage production, like the brewing temperature or the filling level or percentage. The user interface will be discussed later in more detail.

Figure 2:
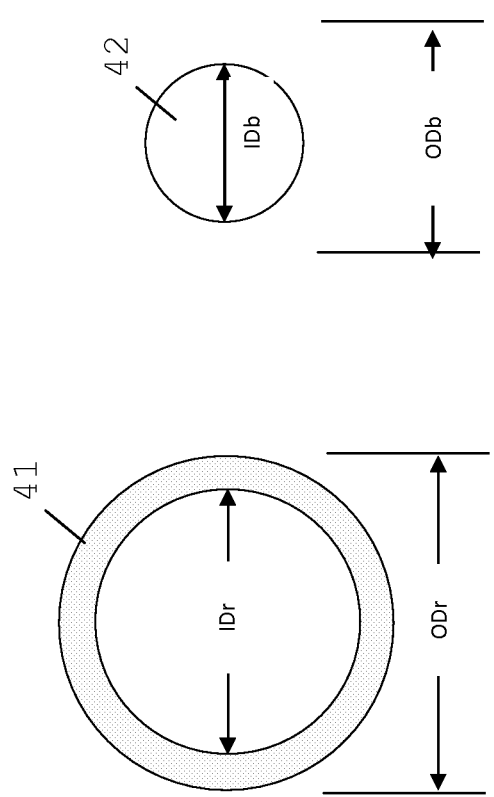
FIG. 2 shows top-view images of a receptacle rim and bottom captured by the first camera.

FIG. 2 shows non-limiting examples of images that may be taken as the first image by the first camera 5. In particular, FIG. 2 shows on the left side an image of the rim 41 of the receptacle 4, and on the right side an image of the bottom 42 of the receptacle 4. Typically, the two images shown in FIG. 2 can be overlaid in the first image, since it is a top-view image of the receptacle 4. However, two or more images can also be extracted from the camera image. From the first image, an area of the rim 41 and the bottom 42 can be derived. In particular, the control unit 7 is adapted to calculate these parameters based on the first image. The control unit 7 can therefore use known image processing techniques. Further, the control unit 7 is adapted to calculate inner diameters (IDr and IDb) and outer diameters (ODr and ODb) of the rim 41 and the bottom 42, respectively. Additionally, the control unit 7 can calculate a wall thickness of the receptacle 4.

Figure 3:
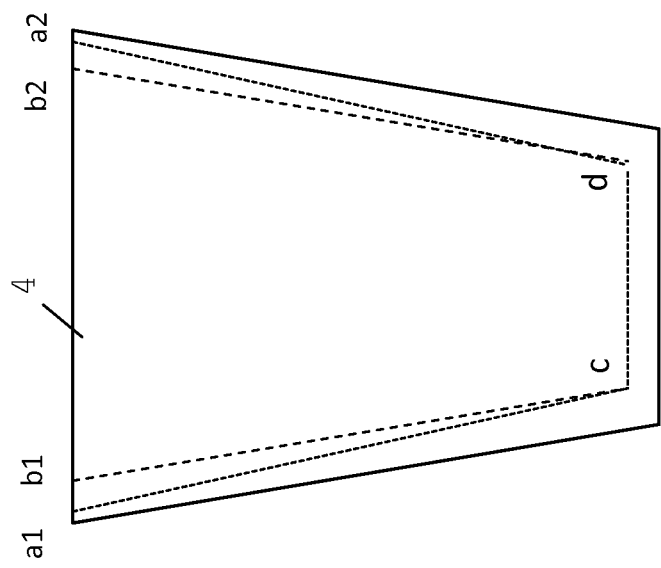
FIG. 3 shows a comparison between a uniform and a non-uniform wall thickness of a receptacle.

FIG. 3 shows a receptacle 4 with an uneven wall thickness, i.e. with a wall thickness that varies over the height of the receptacle 4. If the wall thickness is uneven, it has different slopes on the inside and outside, such as the slopes a1c and a2d shown in FIG. 3. In certain, non-limiting embodiments, the control unit 7 is configured to simulate such slopes as shown in FIG. 3 as soon as the cross-sectional image, i.e. the side-view image, of the receptacle 4 and the top-view images of the rim 41 and bottom 42 of the receptacle 4 are obtained by the first camera 5 and the second camera 6, respectively. The non-uniform thickness of the wall of the receptacle 4 can thus be taken into account by the control unit 7, in order to calculate the volume of the receptacle 4, which can be filled with the beverage, more precisely. Alternatively, the control unit 7 can also assume the wall slopes to be b1c and b2d for a uniform thickness. Thus a faster, but less precise, calculation of the volume can be carried out.

Figure 4:
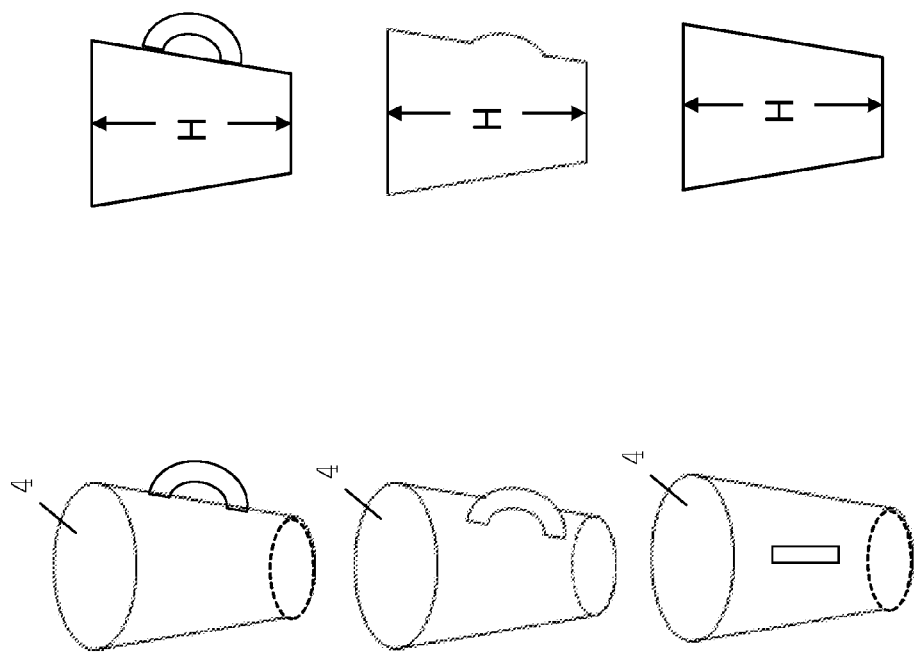
FIG. 4 shows side-view images and relevant profiles of receptacles with different laying angles but same height captured by the second camera.
Figure 5:
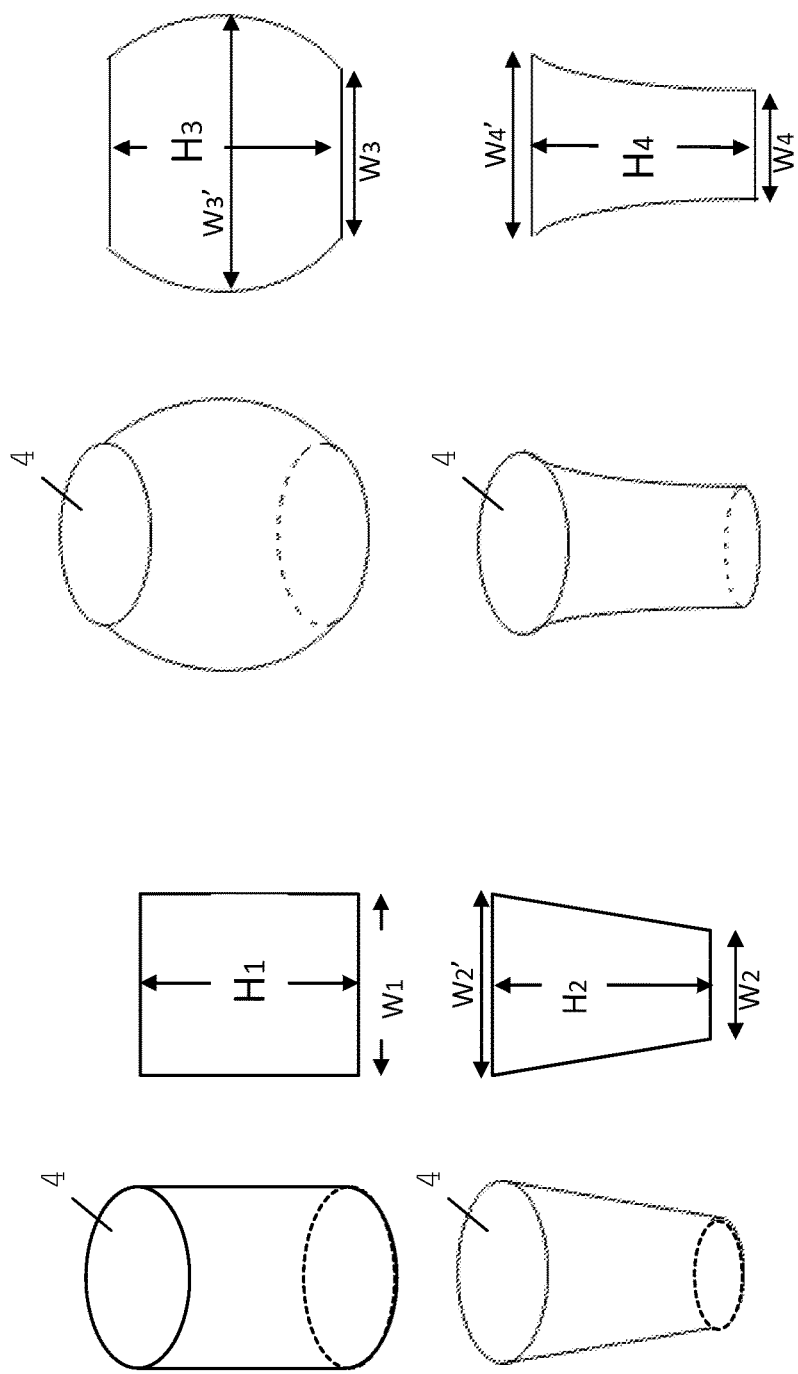
FIG. 5 shows profiles of variant receptacles.

FIG. 4 shows examples of side-view images obtained by the second camera 6 for receptacles 4 of different shapes, in particular receptacles 4 with the same height H but with different laying angles. FIG. 5 shows examples of side-view images of receptacles 4 with different shapes. One purpose of using the side-view images taken by the second camera is to determine the outer shape of receptacle, i.e., whether it is a regular or irregular one, whether the side wall has a curve, or a bulge. The control unit can simulate the shape of the receptacle from the image(s) and calculate the volume based on a proper geometric model.

Regardless of the laying angles and regardless of the shape of the used receptacles 4, the side-view images taken by the second camera 6 can be used by the control unit 7 to derive and calculate the outer height H (i.e., $H_1$, $H_2$, $H_3$ or $H_4$) and width W of the receptacles. The width W of the receptacle can vary over its height and the control unit can determine the width $W_1$, $W_2$, $W_3$, $W_4$ at the outer bottom of the receptacle, the width $W_{2'}$, $W_{4'}$ at the side rim 41 of the receptacle or also the largest width $W_{3'}$ in an intermediate outwardly bulged or, on the contrary inwardly curved, region of the receptacle.

Together with the above-described parameters (i.e. the top and bottom areas from the first image and the height and width from the second image) the receptacle volume (e.g. in ml) can be precisely calculated by the built-in control unit 7 of the machine 1. The control unit 7 can calculate said volume for receptacles of variant shapes, volumes and/or materials. The control unit 7 can control a beverage production according to the calculated receptacle volume and the selected filling level, i.e. it can choose the amount of water for brewing the beverage accordingly.

Furthermore, in order to obtain an accurate inner height value of the receptacle, a possible calculation, by image forming principle, consists in determining the distance between the camera from the inner bottom of the receptacle and the distance between the camera from the rim. In another principle, the inner height is simply determined as a predetermined variation of the outer height.

Figure 6:
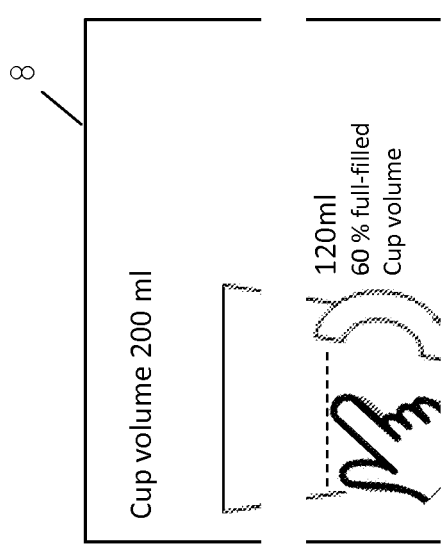
FIG. 6 shows a user interface of the beverage preparation machine of the presently disclosed and/or claimed inventive concept(s), in particular a touch-screen for selecting the filling volume of the receptacle.

FIG. 6 shows an example of a user interface 8 of the beverage production machine 1 of the presently disclosed and/or claimed inventive concept(s). For reasons of user-friendliness, a touch-screen or a touch-pad can be equipped on the user interface 8. The touch-screen can be used to display an image of the receptacle 4, e.g. an image that is calculated (simulated) by the control unit 7 based on the first and second image. The user interface 8 can further display the calculated receptacle volume and/or the currently selected filling level or percentage or volume. The currently selected filling level can be shown as a virtual filling level in the displayed image of the receptacle 4 and/or as value (e.g. in ml) or both as shown in FIG. 6. The user can e.g. use the touch-screen of the user interface 8 to move the virtual filling level up or down e.g. by finger as desired. Instead of a touch-screen, the user interface 8 can also be provided with a scroll wheel allowing the user to select the desired filling level via scrolling. The user can also input a determined number, e.g. the absolute volume of the beverage or the percentage of the total receptacle volume, in order to select the desired filling volume.

The beverage preparation machine 1 can furthermore be configured to sense and monitor the water volume in the water tank 9, e.g. via a pressure sensor or any other suitable filling level sensor, e.g., an ultrasonic, buoyancy or laser-type level sensor. The control unit 7 can process the signal received from such a pressure sensor, and can compare the signal with pre-stored pressure values that are correlated with filling levels of the water tank 9. When the water volume in the water tank 9 is less than the currently selected filling volume, the control unit 7 can further be configured to issue a feedback signal such as a warning signal and/or a signal disabling the water pump. For example, a warning signal can be displayed on a (touch-) screen of the user interface 8, and can indicate that an insufficient amount of water for filling beverage into the receptacle 4 with the selected filling volume is available. For example, the virtual filling level in the displayed image of the receptacle 4 can e.g. be indicated as blinking and/or in red color, when the available amount of water is too low. Otherwise, the filling level can be displayed e.g. permanently and/or in green color. However, also other warning signals, like acoustical signals, vibration of the machine 1, or optical signals, like an LED light, are thinkable.

The beverage preparation machine 1 can moreover be pre-stored with a database by using the memory unit 10. In the database, different types of receptacles 4 can be recorded. Further, images (e.g. first and/or second images) of receptacles can be correlated with the recorded receptacles, and can be correlated with information about the receptacles, e.g. their volume, height, width, outer diameters, inner diameters or the like. Also a consumption history can be recorded in the database for each recorded receptacle 4. In this way, a receptacle 4, which is perceived in the field of view of the two cameras 5, 6 can be quickly matched by comparing the captured images with the images in the database, and the accurate receptacle volume can be obtained without further simulation and calculation by the control unit 7. Thus, the receptacle volume can be provided faster and more precisely.

Figure 7:
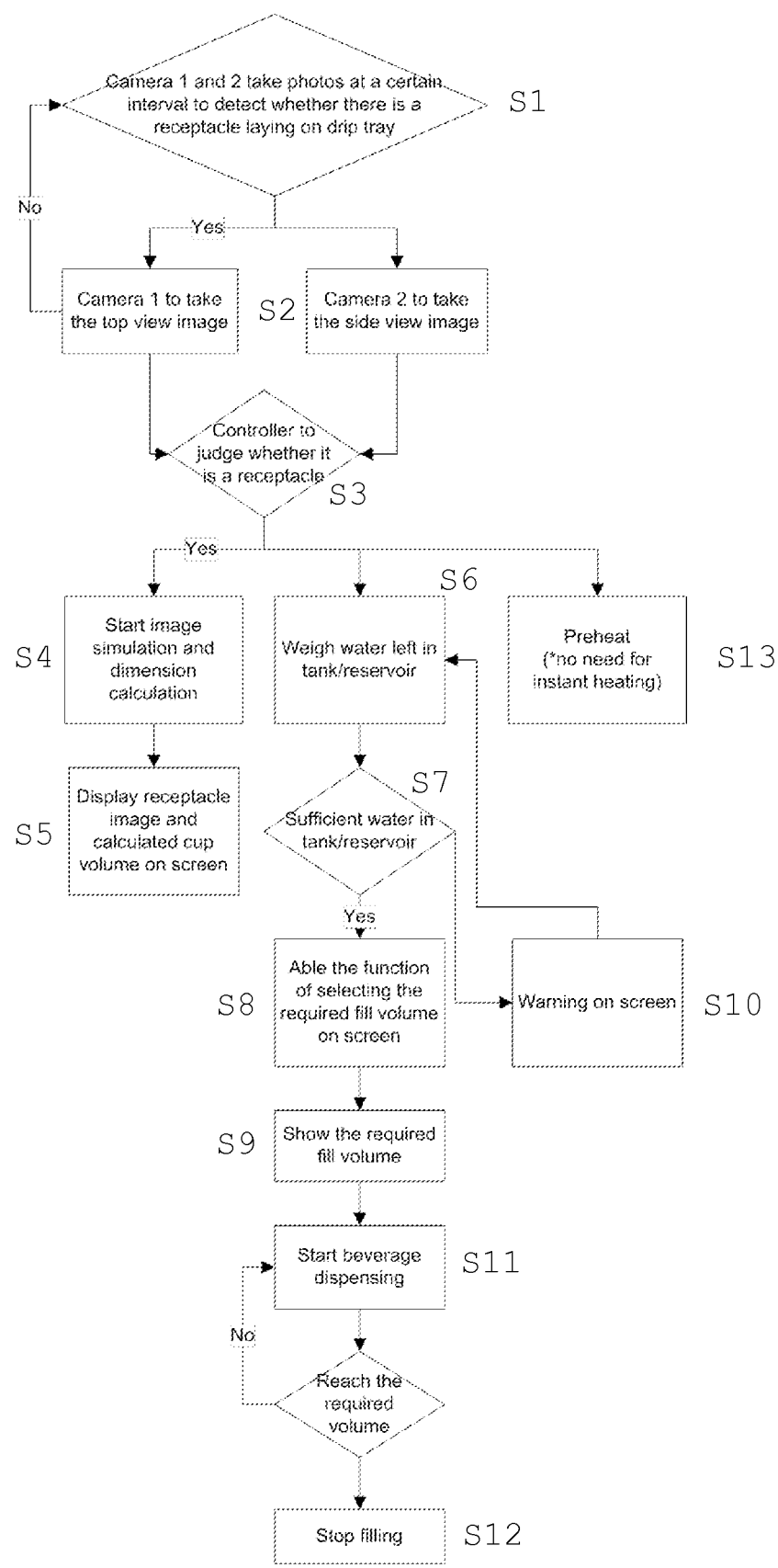
FIG. 7 shows a flowchart of a possible filling process with image recognition according to a beverage preparation method of the presently disclosed and/or claimed inventive concept(s).

The database can be enlarged when an unknown receptacle 4, i.e. a receptacle 4 that is not stored yet in the database, is used by a user for receiving a beverage. FIG. 7 shows an example of a working flowchart according to a beverage production method.

In a first step S1, the at least two cameras 5, 6 capture images at certain time intervals, in order to detect, whether a receptacle 4 is correctly positioned for dispensing a beverage. The machine 1 can be activated from a stand-by phase, as soon as receptacle images are taken by the at least two cameras 5, 6 at a number of consecutive time intervals.

If a receptacle 4 is detected in step S1, in a second step S2 the first camera 5 takes, for example but not by way of limitation, a top-view image of the receptacle 4, and the second camera takes, for example but not by way of limitation, a side-view image of the receptacle 4.

In step S3 the control unit 7 then determines, whether the imaged object really is a receptacle 4. The control unit 7 can make this determination based on a size and/or a shape of the imaged object.

If the control unit 7 determines in step S3 that a receptacle 4 is positioned for receiving a beverage, it carries out a calculation of the receptacle volume and a simulation of a receptacle image in step S4. Thereafter, in step S5, the control unit 7 causes the interface unit 8 to display the simulated receptacle image and/or the calculated receptacle volume.

If the control unit 7 determines in step S3 that a receptacle 4 is positioned for receiving a beverage, it may also determine in step S6 the amount of water contained in the water tank 9. Therefore, the control unit 7 controls, for example, a pressure sensor. Thereafter, the control unit 7 determines in a step S7, whether the amount of water is sufficient or not. If the amount water is sufficient, the control unit 7 causes the interface unit 8 to display in step S8 a function for selecting a desired filling percentage, e.g. by means of dragging a virtual filling level in the displayed image of the receptacle 4, and to display in step S9 the selected filling level or filling volume. If the amount of water is insufficient, a warning signal can be issued in step S10. In step S11 the control unit 7 causes the machine 1 to start dispensing, i.e. to operate a pump. The control unit 7 can continuously measure the dispensed beverage volume, e.g. by means of a flow meter, or by means of measuring the dispensing time at a pre-set flow rate. If the selected filling level is reached, the control unit 7 stops the filling process in step S12.

When the heater has a relatively high thermal mass of inertia, e.g., for a thermoblock, if the control unit 7 determines in step S3 that a receptacle 4 is positioned for receiving a beverage, the control unit 7 activates the heater on a heating mode (preheat mode). Such activation enables to shorten the waiting time. When the heater is an instant heater, this step is not necessary.

The beverage preparation machine 1 is also able to link the receptacle 4 currently used for receiving a beverage to the user's beverage consumption, which is especially useful for families and small/medium size offices. Given that no duplicate receptacles 4 are used, the machine 1 can record the beverage consumption of any certain receptacle 4, which is included in the database. The machine 1 can further give e.g. health recommendations on the screen of the user interface 8, if e.g. a high amount of sugar/fat/calories were consumed with the same receptacle 4 during a predetermined duration of time. Alternatively, the machine 1 can send the consumption record to one or more appointed terminals of the user, such as a mobile phone, a computer, a blog, a website etc. The sending can be carried out by means of a built-in GSM and/or WIFI module. Moreover, beverage consumption data, like volume and/or flavor, can be sent to a customer service center for consumer analysis. In particular, the machine 1 can thus realize an interactive communication with a user by linking known receptacles 4 to consumption records.

Figure 8:
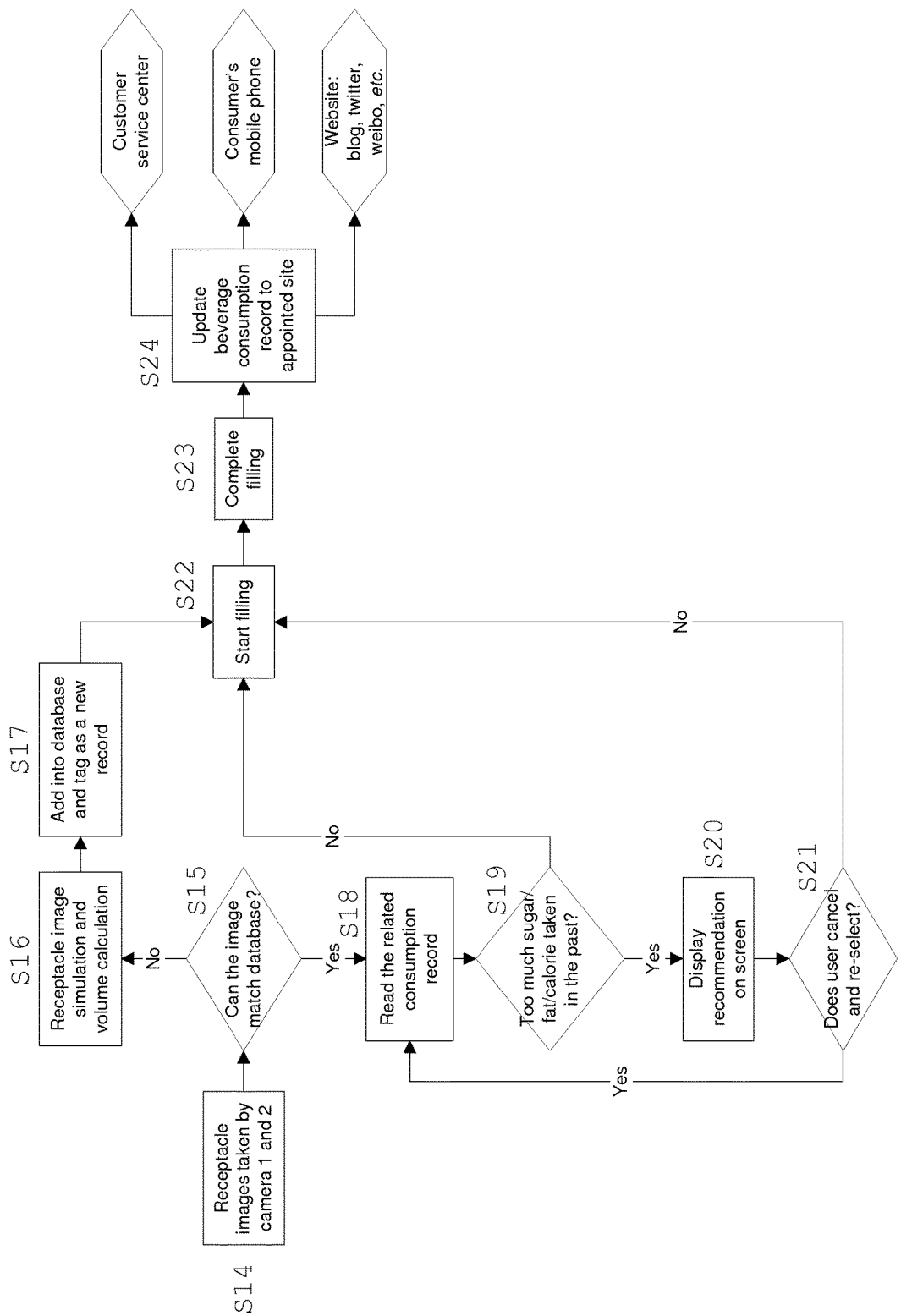
FIG. 8 shows a flowchart of a possible interactive communication process of a beverage preparation machine and a user according to a beverage preparation method of the presently disclosed and/or claimed inventive concept(s).

FIG. 8 shows an example of a flowchart for such an interactive communication process. In step S14 the control unit 7 receives the first image and the second image taken by the first camera 5 and second camera 6, respectively. Thereafter, the control unit 7 decides in step S15, whether the receptacle 4 is already included in the database, i.e. whether the first and second image match any image stored in the database.

If the control unit 7 determines in step S15 that the receptacle 4 is not yet included in the database, the control unit 7 calculates the receptacle volume and generates a simulated image of the receptacle 4 in step S16. In step S17, the control unit 7 adds the receptacle 4 to the database and tags it as a new entry. Then, the control unit 7 initiates the filling process in step 22.

If the control unit 7 determines in step S15, that the receptacle 4 is already included in the database, the control unit 7 reads the related consumption record in step S18. In step S19 the control unit 7 can determine nutritional threshold(s) based on a consumption record over a determined period of time, e.g., whether the user of said receptacle 4 has already consumed a too high level of sugar, fat/oil or calories, caffeine or combinations thereof. The nutritional threshold(s) can be set individually for each user, i.e. each receptacle 4 recorded in the database. If the consumed sugar/fat/calories are determined to be below the respective threshold, the control unit 7 initiates the filling process in step 22. If however, the user has consumed too much sugar/fat/calories in the past, i.e. the consumed sugar/fat/calories are determined to be equal or above the respective threshold, the control unit 7 can cause the user interface 8 to display a recommendation in step S20. If the user discards the recommendation, for example by pressing a button or by a gesture on the touch-screen, the control unit 7 initiates the filling process in step S22. The user can also cancel the current beverage selection in step S21, and can select a new beverage and/or a new filling level.

After the filling of the beverage into the receptacle 4 is completed in step S23, the control unit 7 can update the beverage consumption record regarding the currently used receptacle 4 in the database. Further, the control unit 7 can send the consumption record or information regarding the update of the consumption record to a customer service center, a mobile phone of the user (as stored in the database) or a website, a blog, twitter, etc. (as also stored in the database).

In summary, the presently disclosed and/or claimed inventive concept(s) presents a beverage preparation machine 1 capable of determining a beverage filling volume of receptacles and a corresponding beverage preparation method. The machine 1 of the presently disclosed and/or claimed inventive concept(s) is able to automatically determine the volume of various kinds of receptacles 4. The determination of the receptacle volume is based on at least two captured images of the receptacle 4. Regardless of the shape, size, empty volume and/or material of the used receptacle 4, the user can freely choose the filling percentage, volume or level of the beverage selected to be dispensed by the machine 1.

The invention claimed is:
1. A beverage preparation machine, comprising:
 a beverage outlet for dispensing a beverage into a receptacle;
 a first camera for capturing a first image of the receptacle, wherein the first camera is provided with anti-condensation means;
 a second camera for capturing a second image of the receptacle;
 a user interface for selecting a filling level or percentage of the receptacle; and
 a control unit configured to determine a receptacle volume based on the first image and the second image, and to determine a beverage volume to be dispensed based on the receptacle volume and the selected filling level or percentage.

2. The beverage preparation machine according to claim 1, wherein the first camera is positioned for capturing a top-view image of the receptacle as the first image, and the second camera is positioned for capturing a side-view image of the receptacle as the second image.

3. The beverage preparation machine according to claim 1, wherein the first camera is positioned at the beverage outlet, and the second camera is positioned between the beverage outlet and a support for receiving the receptacle.

4. The beverage preparation machine according to claim 1, wherein the control unit is configured to calculate:
from the first image: the area of the rim, the inner diameter, outer diameter of the rim of the receptacle, the area of the inner bottom, the inner diameter of the bottom of the receptacle, and a wall thickness of the receptacle and,
from the second image: the outer shape of the receptacle, the outer height of the receptacle, the width or outer diameter of the outer bottom of the receptacle.

5. The beverage preparation machine according to claim 4, wherein control unit is configured to further calculate from the second image the largest width and a width increase, if any, of the receptacle at a distance of the top and bottom of the receptacle.

6. The beverage preparation machine according to claim 1, wherein the control unit is configured to calculate from the first and second image an uneven wall thickness of the receptacle.

7. The beverage preparation machine according to claim 1, wherein the control unit is configured to display based on the second image an image of the receptacle on the user interface.

8. The beverage preparation machine according to claim 1, wherein the user interface comprises a touch-screen or touch-pad.

9. The beverage preparation machine according to claim 1, wherein the control unit is configured to determine a water volume in a water tank of the machine and to issue a feedback signal when the water volume is less than the beverage volume to be dispensed.

10. The beverage preparation machine according to claim 9, wherein the control unit is configured to issue a warning signal when the water volume is less than the determined receptacle volume.

11. The beverage preparation machine according to claim 1, further comprising a memory unit for storing a database including pre-stored images of receptacles, wherein the control unit is configured to determine whether the receptacle is included in the database by matching the first image and/or the second image with the pre-stored images of receptacles, and to read a correspondingly stored receptacle volume if the receptacle is included in the database.

12. The beverage preparation machine according to claim 11, wherein the control unit is configured to update the database by storing a new image of the receptacle based on the first image and/or the second image.

13. The beverage preparation machine according to claim 11, wherein the control unit is configured to record a beverage consumption for each of the receptacles in the database, and to display on the user interface information regarding the beverage consumption of a currently used receptacle.

14. The beverage preparation machine according to claim 1, wherein the first camera and the second camera are configured to capture images at predetermined time intervals, and the control unit is configured to activate the beverage preparation machine from a stand-by mode, when the first and second image of the receptacle, respectively, are captured for a predetermined number of consecutive time intervals.

15. A beverage preparation machine, comprising:
a beverage outlet for dispensing a beverage into a receptacle;
a first camera for capturing a first image of the receptacle;
a second camera for capturing a second image of the receptacle;
a user interface for selecting a filling level or percentage of the receptacle;
a control unit configured to determine a receptacle volume based on the first image and the second image, and to determine a beverage volume to be dispensed based on the receptacle volume and the selected filling level or percentage; and
a memory unit for storing a database including pre-stored images of receptacles, wherein the control unit is configured to determine whether the receptacle is included in the database by matching the first image and/or the second image with the pre-stored images of receptacles, and to read a correspondingly stored receptacle volume if the receptacle is included in the database.

16. The beverage preparation machine according to claim 15, wherein the control unit is configured to update the database by storing a new image of the receptacle based on the first image and/or the second image.

17. The beverage preparation machine according to claim 15, wherein the control unit is configured to record a beverage consumption for each of the receptacles in the database, and to display on the user interface information regarding the beverage consumption of a currently used receptacle.

\* \* \* \* \*